US006704184B2

(12) United States Patent
Alton

(10) Patent No.: US 6,704,184 B2
(45) Date of Patent: Mar. 9, 2004

(54) ARC SUPPRESSION IN WAVEGUIDE USING OPTICAL DETECTOR AND FORCED AIR

(75) Inventor: William J. Alton, Pepperell, MA (US)

(73) Assignee: The Ferrite Company, Inc., Hudson, NH (US)

( * ) Notice: Subject to any disclaimer, the term of this patent is extended or adjusted under 35 U.S.C. 154(b) by 591 days.

(21) Appl. No.: 09/760,024

(22) Filed: Jan. 12, 2001

(65) Prior Publication Data

US 2004/0027773 A1 Feb. 12, 2004

(51) Int. Cl.7 .................................................. H02H 1/00

(52) U.S. Cl. ............................. 361/123; 361/2; 361/18; 361/42

(58) Field of Search ............................ 361/2, 3, 12, 18, 361/43, 59, 78, 42, 115, 118, 123

(56) References Cited

U.S. PATENT DOCUMENTS

| | | | | |
|---|---|---|---|---|
| 3,541,289 A | | 11/1970 | Smith et al. | 219/700 |
| 3,622,733 A | | 11/1971 | Smith et al. | 219/10.55 |
| 3,916,137 A | | 10/1975 | Jurgensen | 219/10.55 |
| 4,287,496 A | * | 9/1981 | Young | |
| 5,075,534 A | * | 12/1991 | Torii et al. | |
| 5,257,872 A | * | 11/1993 | Morgen et al. | |
| 5,438,183 A | | 8/1995 | Hayami et al. | 219/748 |
| 5,565,118 A | * | 10/1996 | Asquith et al. | |
| 6,265,703 B1 | * | 7/2001 | Alton | |

FOREIGN PATENT DOCUMENTS

| | | |
|---|---|---|
| JP | 2-46692 | 2/1990 |
| JP | 2-302507 | 12/1990 |

* cited by examiner

*Primary Examiner*—Stephen W. Jackson
(74) *Attorney, Agent, or Firm*—Hamilton, Brook, Smith & Reynolds, P.C.

(57) ABSTRACT

An arc suppression system is provided which includes a waveguide run for carrying microwave energy, a sensing device, such as a photodetector, for sensing an arc within the waveguide run, and a blowing device for blowing a gas, such as compressed air, into the waveguide run, in response to a sensed arc, to suppress the sensed arc.

28 Claims, 6 Drawing Sheets

ARC SUPPRESSION IN WAVEGUIDE USING OPTICAL DETECTOR AND FORCED AIR

BACKGROUND OF THE INVENTION

This invention relates to a technique for suppressing arcs in an electromagnetic waveguide, and more particularly to a technique that detects the arcs and suppresses them using forced air.

Waveguides have been used for some time as an efficient way to carry microwave frequency energy over distances in a predictable manner. However, waveguides in some instances have a tendency to experience unpredictable behavior such as internal arcing. In particular, even though a waveguide is sized to be capable of operating safely at the expected power levels without introducing a voltage breakdown, certain events or faults may occur to cause an energy discharge within the waveguide itself. Such faults may happen when dust, dirt or other ambient conditions introduce an abnormal voltage condition inside the waveguide. Such arcing may actually continue after the fault is no longer in existence. An arc is of concern because it not only substantially blocks transmission of energy through the waveguide, but also may physically damage the system components.

For example, electromagnetic energy normally travels within the waveguide from an electromagnetic energy source through the waveguide toward a system that makes use of the microwave energy, such as a microwave oven cavity. Once an arc occurs, electromagnetic forces tend to cause it to travel in a reverse direction within the waveguide, back toward the power source. The arc typically absorbs almost half of the forward power, and reflects a similar amount of electromagnetic energy back to the power source. This causes a decrease in power levels at points in the waveguide beyond the arc to negligible levels.

A number of methods have been used in the past to detect and deal with the occurrence of an arc within a waveguide. For example, detectors may be attached to the waveguide which are responsive to the vibratory and electromagnetic disturbances resulting from the arc. The detectors can be arranged not only to determine the existence of an arc but also its location and velocity.

Upon detection of an arc, electronic control circuits can then be used to temporarily shut off the microwave power source or reduce its level so that the arcing will eventually cease. After a suitable delay, to allow any ionization caused by the arc within the waveguide to dissipate, the power source is then brought back on line again.

SUMMARY OF THE INVENTION

Arcing can be especially problematic in certain end uses such as microwave ovens. For example, in industrial process type microwave ovens that are used in large scale cooking applications, continuous and predictable microwave energy levels are required to produce a predicable end result of the cooking process. Any need to shut down the oven to extinguish an arc can therefore be very undesirable.

In accordance with one embodiment of the invention, an arc suppression system is provided which includes a waveguide run for carrying microwave energy, a sensing device, such as a photodetector, for sensing an arc within the waveguide run, and a blowing device for blowing a gas, such as compressed air, into the waveguide run, in response to a sensed arc to suppress the arc.

A controller can be connected to the sensing device and the blowing device for opening a valve of the blowing device, in response to the sensed arc, to allow the gas to suppress the sensed arc. A second blowing device can also be provided for blowing a gas to clean a viewing surface of the sensing device.

A microwave source for producing the microwave energy is further provided wherein the blowing device preferably blows the gas in a direction away from the microwave source. In one embodiment, the compressed gas has a pressure in the range of about 125 psi to 175 psi, and preferably about 175 psi.

In one embodiment, the photodetector is positioned on a bend in the waveguide run, which can be either pressurized or unpressurized. The bend can include 90 degree round bends, H-bends, and E-bends.

In one embodiment, the waveguide run carries the microwave energy to an oven cavity which has articles to be heated continuously fed therethrough. The oven cavity can also be heated by convection heating.

A method of suppressing an arc is also provided which includes providing microwave energy from a microwave source in a waveguide run, sensing an arc formed within the waveguide run, and blowing a gas into the waveguide run, in response to a sensed arc, for suppressing the arc. The method can also include the step of circularly polarizing the microwave energy.

DETAILED DESCRIPTION OF PREFERRED EMBODIMENTS

Figure 1:
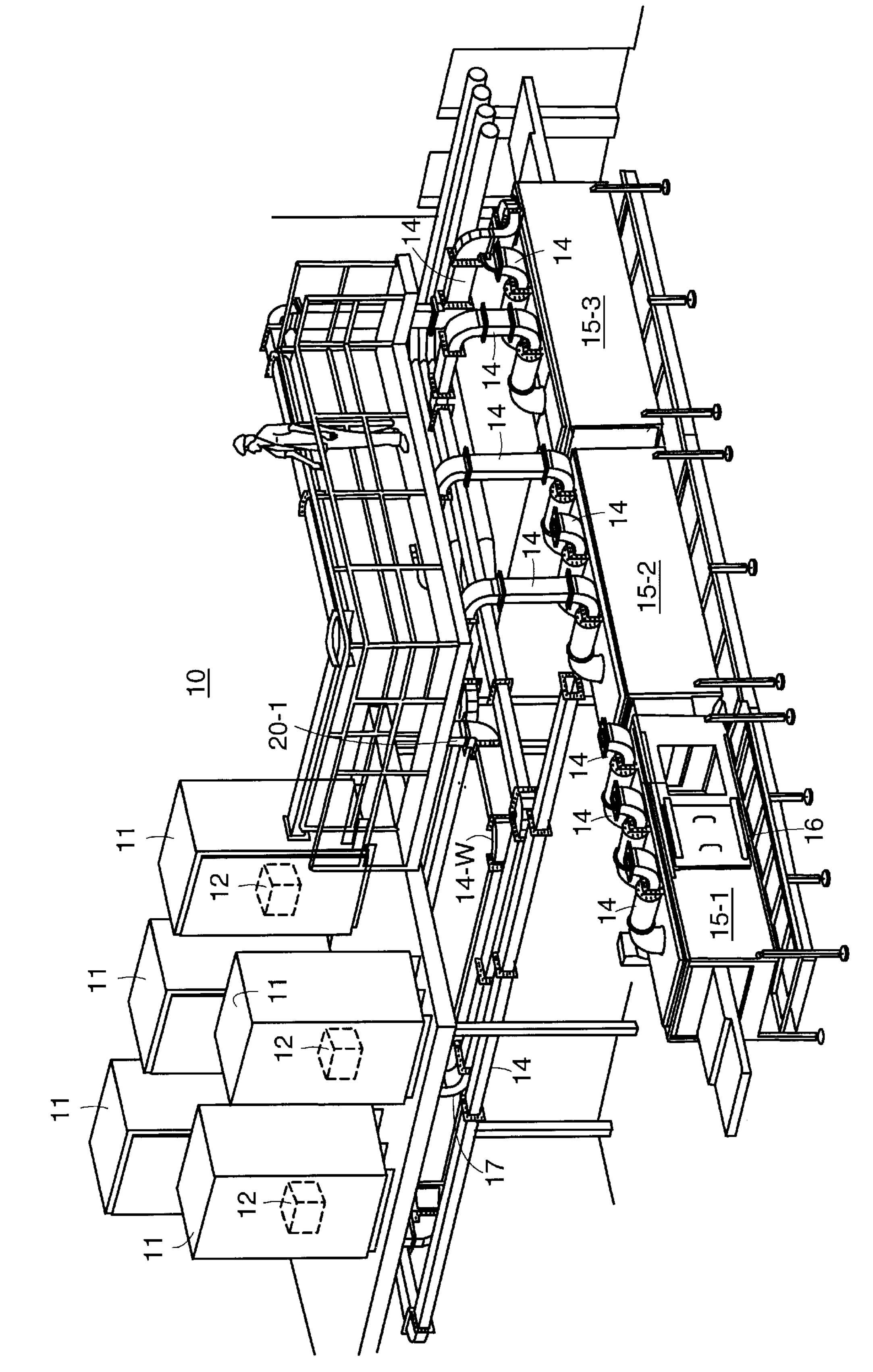
FIG. 1 is a perspective view of a microwave cooking system that makes use of an arc suppression system according to the invention.

Turning attention now to the drawings more particularly, FIG. 1 illustrates an oven system 10 that may be used in a continuous feed industrial type application. The oven system 10 includes a number of cabinets 11 that enclose microwave energy sources 12. Waveguide runs 14 of various types act as conduits for carrying microwave energy generated by the energy sources to the interior of a number of oven cavities or enclosures 15-1, 15-2, 15-3 (collectively, the enclosures 15).

Shown is a continuous feed oven system 10 in which a series of three oven enclosures 15-1, 15-2 and 15-3 are provided. A door assembly 16 may be included on one or more of the enclosures 15 through which access may be provided to facilitate cleaning of the ovens.

The waveguide runs 14 are only partially shown for clarity. For example, the waveguides 14 above enclosure 15-1 appears to be open in the drawing, whereas they actually form a continuous connection between the microwave energy sources 12 and the enclosures 15. It can also be seen that multiple energy sources 12 and waveguides 14 can be used to feed a given one of the enclosures 15.

In addition, although the illustrated system 10 provides for cooking by microwave energy, the system 10 could also provide for cooking through hot air heating by convection.

The waveguide runs 14 can be pressurized or unpressurized for the operation of this invention. Most systems operate unpressurized, but applications such as pasteurization or sterilization usually require pressurization.

Of interest in FIG. 1 is a bent waveguide section 20-1 which forms a part of waveguide run 14-W. The H-bend section 20-1 consists of an upper flange 24 and lower flange 26 to enable coupling of the H-bend section 20-1 to other sections of waveguide 14. The H-bend section 20-1 is formed preferably of aluminum one-eighth of an inch thick with a chromate golden finish per, for example standard MIL-C-5541 Class 3. As more fully explained below, the bent waveguide section 20-1 is located in the waveguide run 14-W at a position where an arc might be expected to set up in a stable position. The present invention suppresses such an arc through a technique that utilizes an arc suppression system (described below) that detects the arcs and suppresses them using forced gas, such as air. The invention can typically be applied to a bent waveguide section 20-1 that is located in a relatively high point in the waveguide run 14-W between the oven enclosure 15 and the power source 12. In one embodiment, the bent waveguide section 20-1 is an H field bend located at or near a relatively high position of the waveguide 14-W. In other embodiments, the arc suppression system can be applied at virtually any point in the waveguide, for example, at bend 17.

Figure 2:
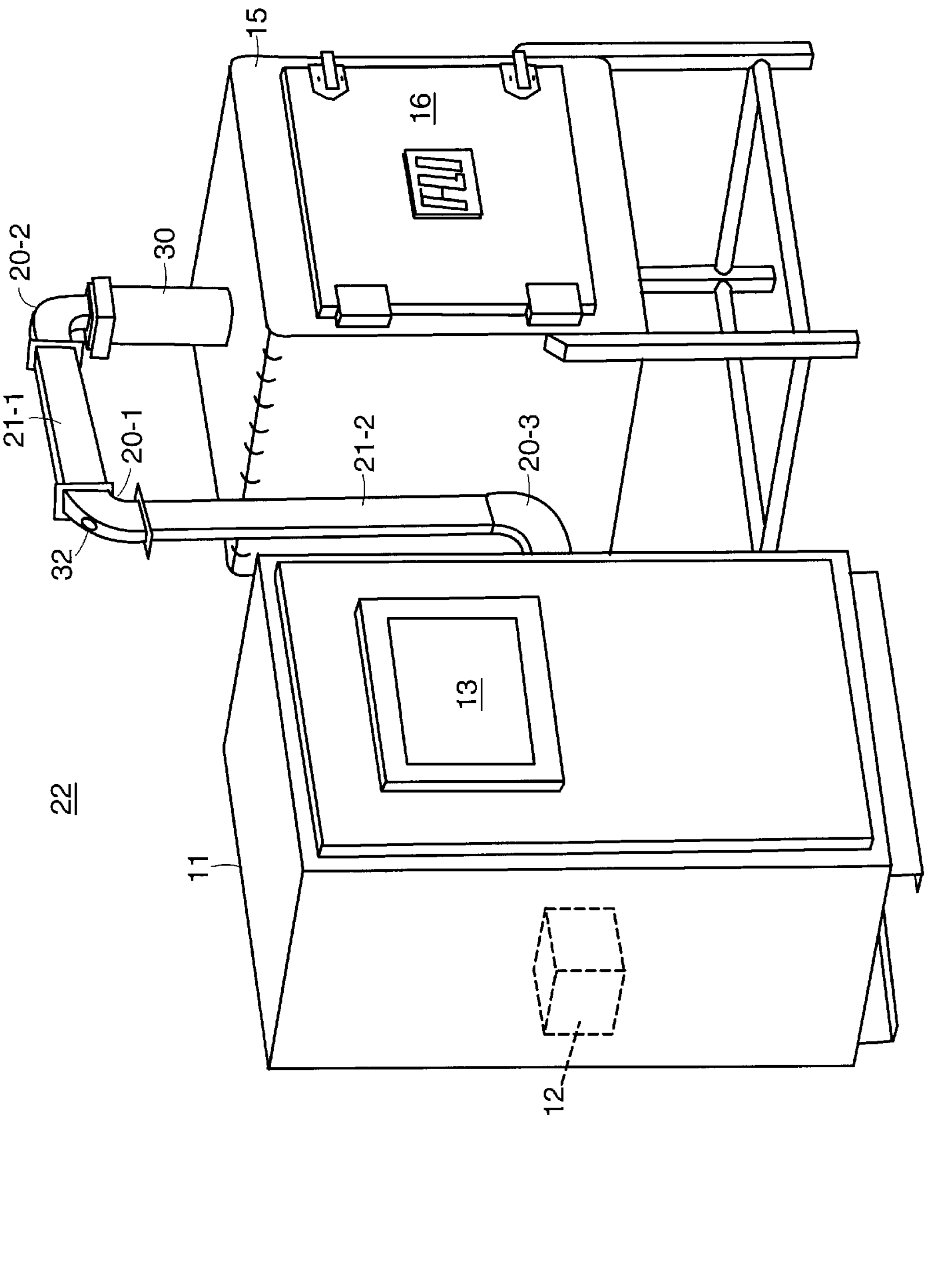
FIG. 2 is a smaller scale batch oven which may also make use of the invention.

A similar bent waveguide section 20-1 is used in the oven system shown in FIG. 2. This figure illustrates a smaller batch type oven 22 that contains a single cabinet 11 having placed therein a microwave energy source 12. A control panel 13 may be accessed by an operator to control the operation of the batch oven 22.

The sensor and gas input to the waveguide are typically placed in a bend so that they are both pointing down a length of straight waveguide. The velocity of an arc is a function of the cw power level, linearly increasing with power level. For 70 kw in WR975 waveguide the speed is about 5 feet per second. A sufficient length of straight guide should be chosen to allow time for arc detection and suppression by the invention. If the bend is in a vertical plane then the length of straight is less critical. The heated ionized gases created by, and part of the arc tend to rise and prevent the arc from moving downward. The arc is therefore trapped in the bend, and will not travel past the detection and suppression device.

Before discussing the manner in which such arcs are suppressed, it will be instructive to review various components of the system 10 to understand why and where such arcs are created. The batch oven 22 makes use of a circularly polarized feed assembly 30 to couple microwave energy to its respective enclosure 15 such that energy originating from the rectangular waveguides 14 are presented to the cavity with a generating circularly polarized orientation. This prevents the supplied microwave energy from coupling to fixed modes internal to the enclosure 15. For more information on the type of polarizing assembly 30 and the batch oven 22 more generally, reference can be made to U.S. Pat. No. 6,034,362 issued Mar. 7, 2000 to Alton.

Feeding the polarizing assembly 30 is a waveguide run that consists of a series of rectangular waveguide sections including H-bend waveguide sections 20-1, 20-2, and 20-3, and straight waveguide sections 21-1 and 22-2. Of interest in this particular arrangement is the H-bend waveguide section 20-1 which is located in a relatively high point in the waveguide run 14. An arc suppression system is preferably positioned at point 32 on waveguide section 20-1.

Figure 3:
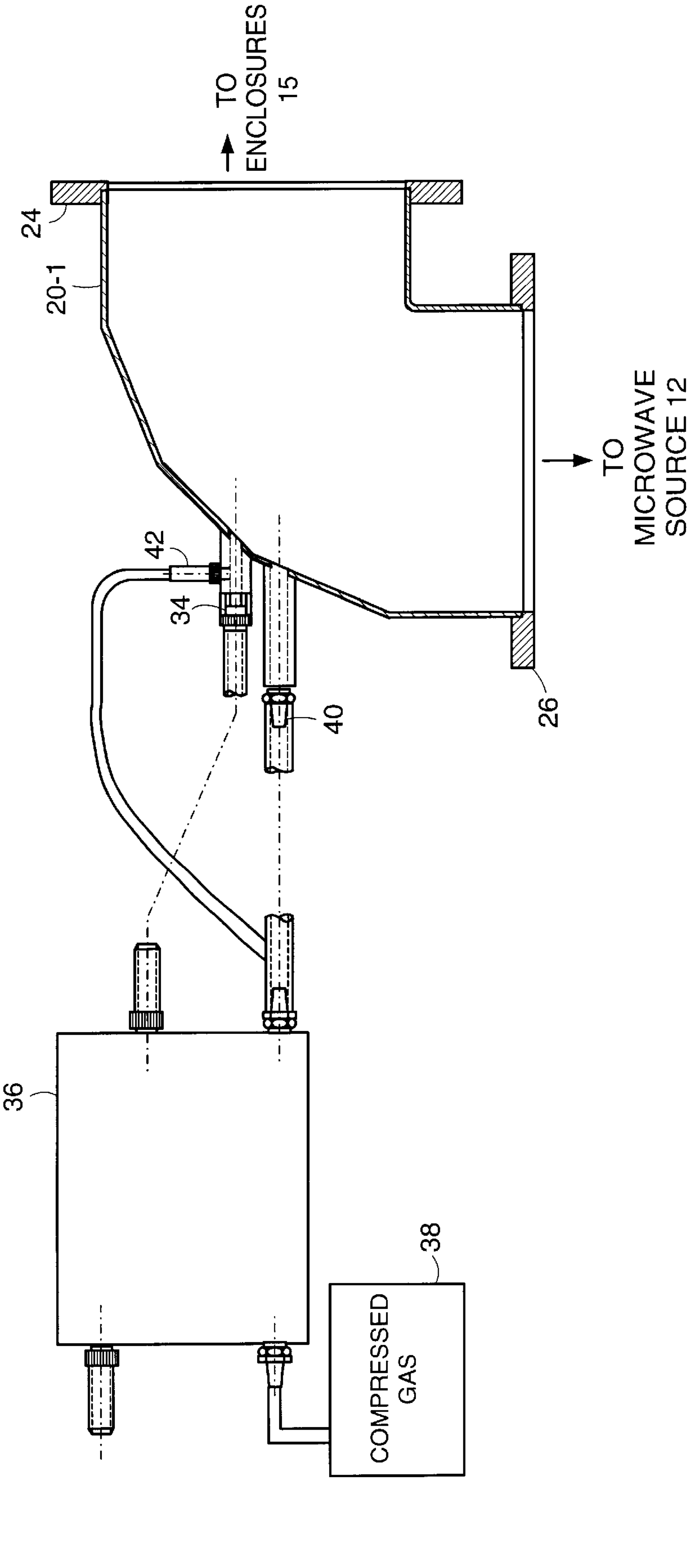
FIG. 3 is a side view of an arc suppression system installed on an H-bend waveguide section.

Turning to FIG. 3, an exemplary arc suppression system is illustrated. Generally, a sensing device 34, such as a photodetector, is preferably positioned on a bend 32 so as to be able to detect the photometric energy of an arc which occurs inside the waveguide 20-1. The sensing device 34 provides feedback to a control box 36 which opens a valve 37 (FIG. 4) allowing a compressed gas, such as air, to be forced into the waveguide via nozzle 40 to suppress the arc. In one embodiment, the compressed gas is stored in a tank 38 at a pressure of between about 125 and 175 psi, preferably about 175 psi. Preferably, the gas forces the arc away from the microwave source 12 in the direction where the power is much less and unable to sustain the arc. It is believed that a sufficiently strong blast of gas disrupts the ions in the waveguide and helps extinguish the arc. A so-called H-bend section has the axis of its bend along its respective H-plane.

The arc suppression system can further include a blowing device adjacent the sensing device 34 to clean the viewing surface of the sensing device. More particularly, a nozzle 42 can be configured to direct a compressed gas, for example, from tank 38, at the sensing device 34 to remove any debris that may have accumulated at or near a viewing surface of the sensing device.

Figure 4:
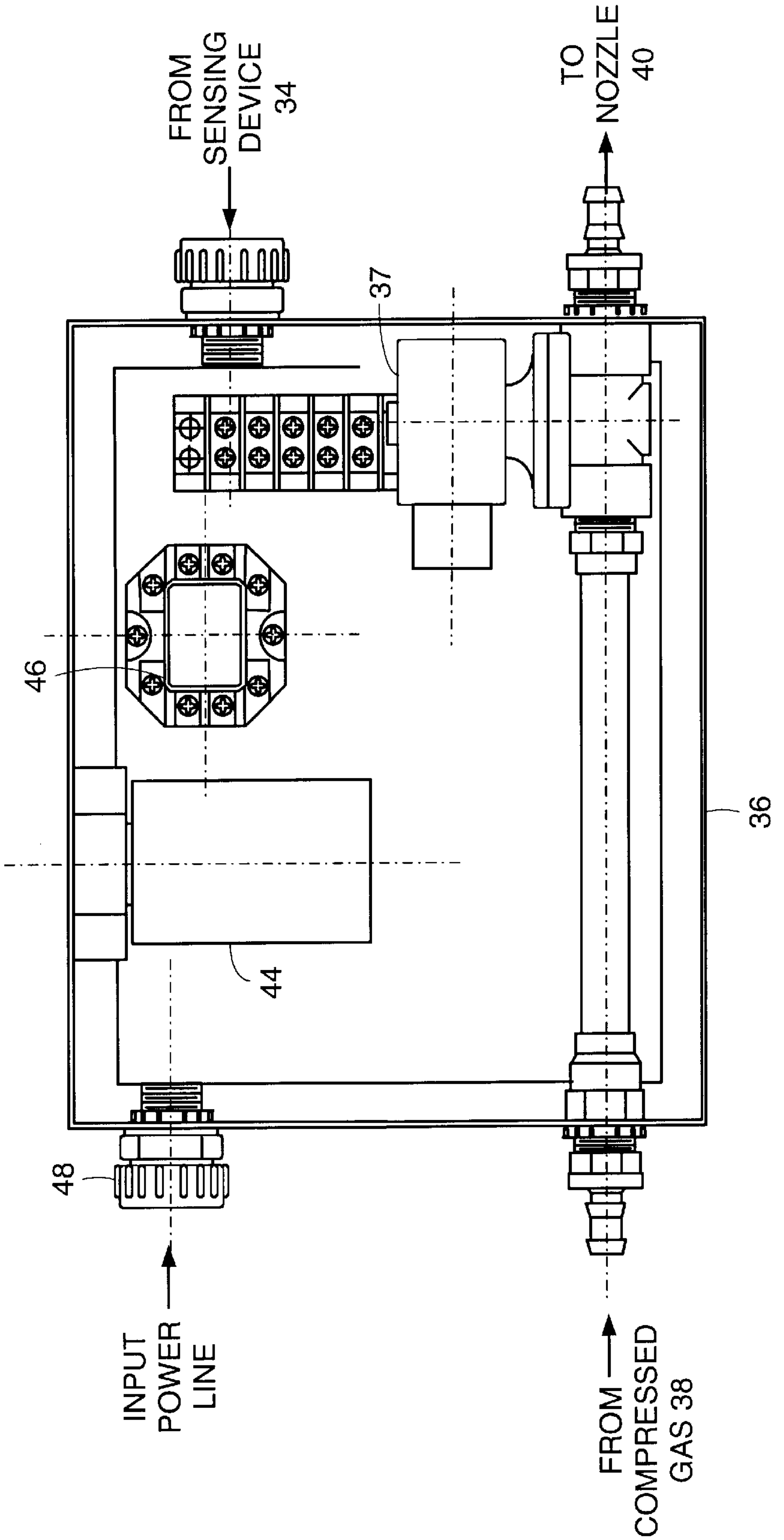
FIG. 4 is a partial cut-away view of a control box that forms part of the arc suppression system shown in FIG. 3.

FIG. 4 illustrates further details of the control box 36. An electronic controller 44, such as a microprocessor, controls operation of the suppression system including sensing device 34. A relay 46 is operated by the controller 44 to open the valve 37 allowing compressed gas to flow from the tank 38 to the nozzle 40. In one embodiment, the valve 37 is open until the sensing device 34 no longer detects an arc in the waveguide. A power source, such as typical 120 volt line, is supplied to the control box 36 at conduit 48.

Figure 5:
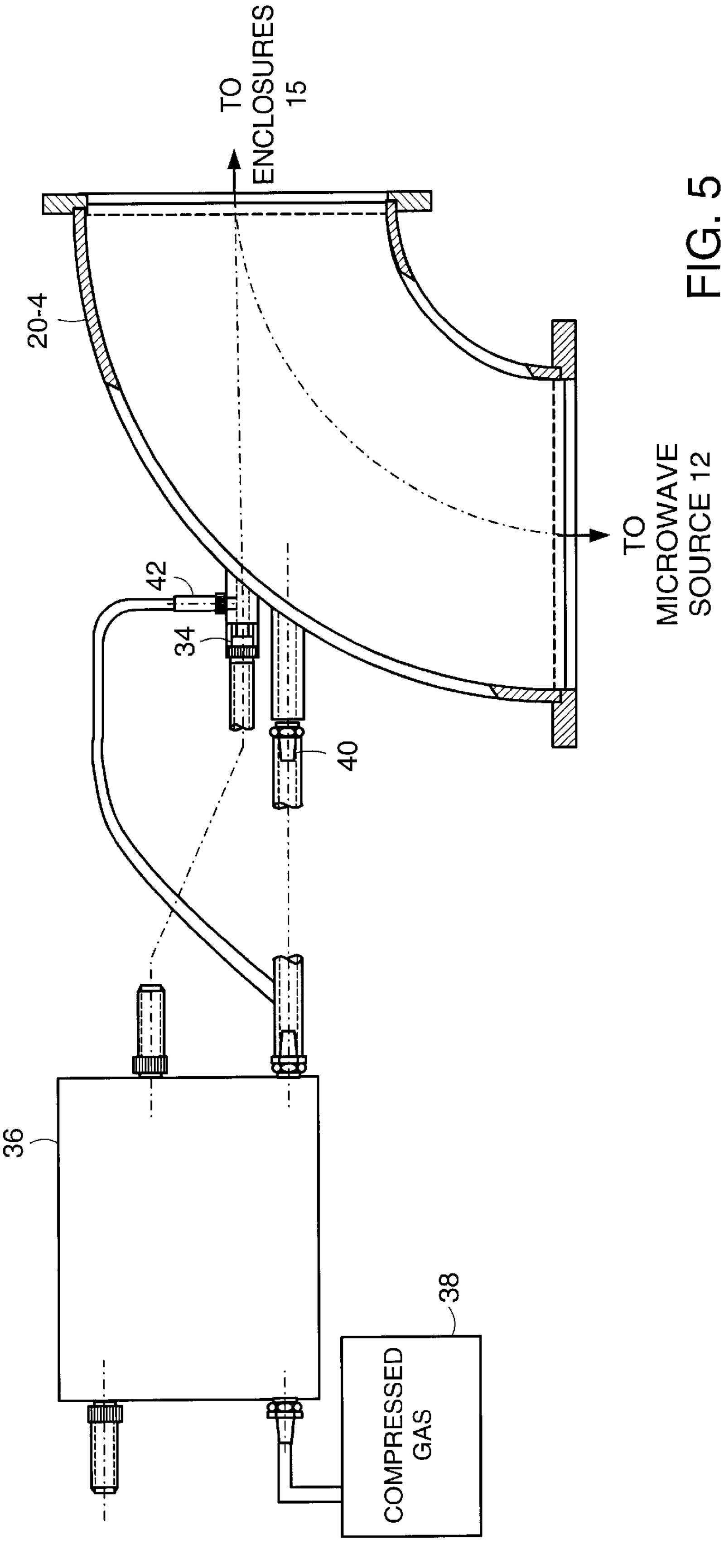
FIGS. 5 and 6 are side views of an arc suppression system installed on a 90 degree round bend waveguide section and a E-bend waveguide section, respectively.
Figure 6:
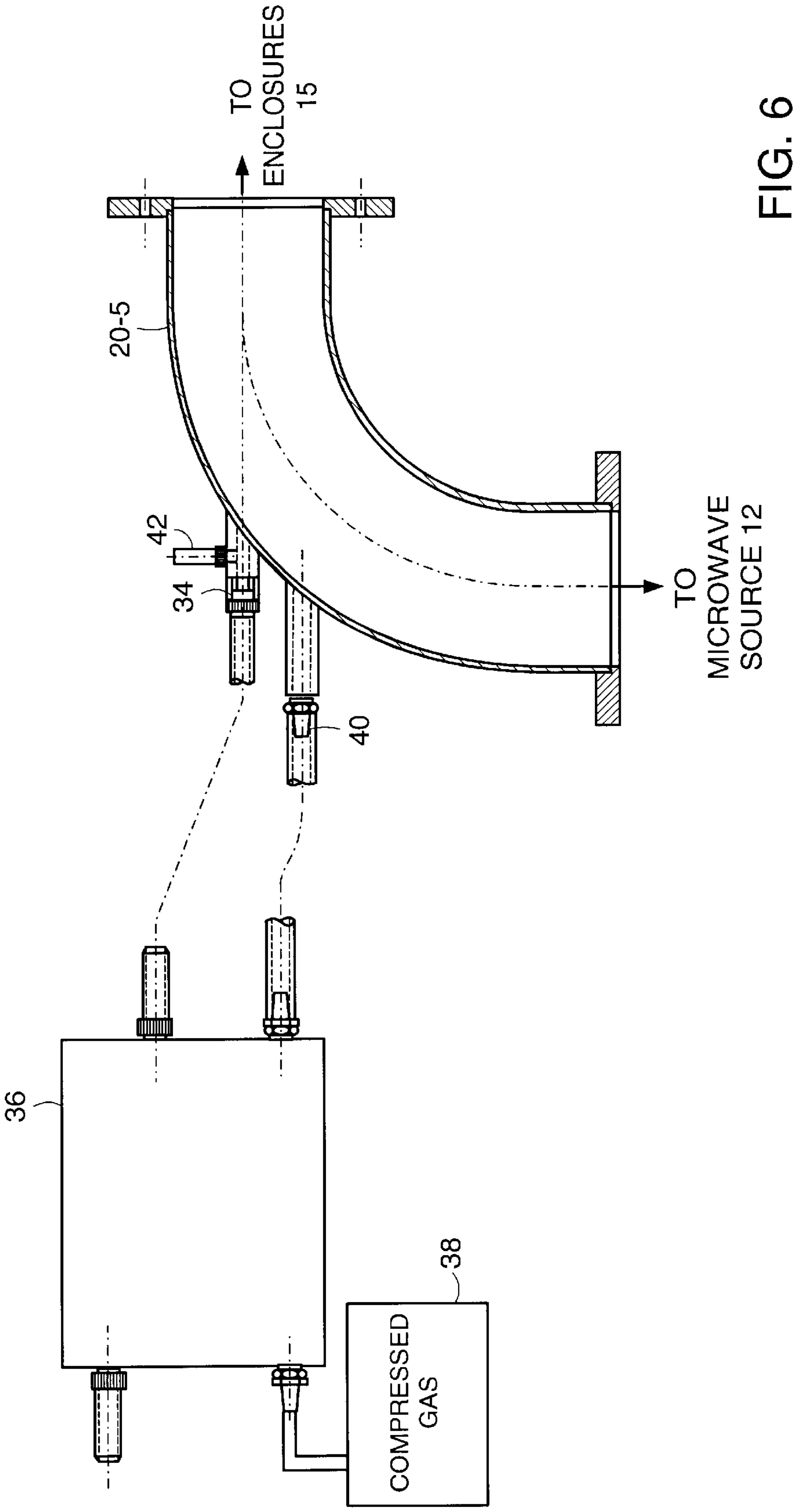

FIGS. 5 and 6 illustrate the arc suppression system installed in alternative waveguide sections. More particularly, FIG. 5 illustrates the arc suppression system installed on a 90 degree round bend waveguide section 20-4. FIG. 6 illustrates the arc suppression system installed on a E-bend waveguide section 20-5.

While this invention has been particularly shown and described with references to preferred embodiments thereof, it will be understood by those skilled in the art that various changes in form and details may be made therein without departing from the scope of the invention encompassed by the appended claims. For example, other shapes of bends can accomplish the same results.

What is claimed is:

1. An arc suppression system, comprising:

a waveguide run for carrying microwave energy;

a sensing device for sensing an arc within the waveguide run; and a blowing device for blowing a gas into the waveguide run, in response to a sensed arc, to suppress the sensed arc.

2. The system of claim 1, further comprising a microwave source for producing the microwave energy.

3. The system of claim 2, wherein the blowing device blows the gas in a direction away from the microwave source.

4. The system of claim 1, wherein the gas is compressed air.

5. The system of claim 1, wherein the sensing device includes a photodetector.

6. The system of claim 5, wherein the photodetector is positioned on a bend in the waveguide run.

7. The system of claim 6, wherein the bend is selected from the group consisting of 90 degree round bends, H-bends, and E-bends.

8. The system of claim 1, further comprising a controller connected to the sensing device and the blowing device for opening a valve of the blowing device, in response to the sensed arc, to allow the gas to suppress the sensed arc.

9. The system of claim 1, wherein the arcs are urged in one direction along the waveguide run by electromagnetic field force, and in another direction by hot air gases.

10. The system of claim 1, wherein the waveguide run carries the microwave energy to an oven cavity, the oven cavity having articles to be heated continuously fed there-through.

11. The system of claim 10, wherein the oven cavity is also heated by convection heating.

12. The system of claim 1, wherein the waveguide run is unpressurized.

13. The system of claim 1, further comprising a second blowing device for blowing a gas to clean a viewing surface of the sensing device.

14. An arc suppression system, comprising:

a sensor for sensing an arc;

a blowing device for blowing a gas to suppress a sensed arc; and a controller connected to the sensor and the blowing device for triggering the blowing device to blow the gas, in response to the sensed arc, to suppress the sensed arc.

15. The system of claim 14, wherein the arc is formed within a waveguide run which carries microwave energy from a microwave source to an oven cavity.

16. The system of claim 15, wherein the oven cavity is also heated by convection heating.

17. The system of claim 14, further comprising a second blowing device for blowing a gas to clean a viewing surface of the sensing device.

18. The system of claim 14, wherein the blowing device is coupled to a source of compressed gas, the compressed gas having a pressure in the range of about 125 psi to 175 psi.

19. The system of claim 18, wherein the pressure is about 175 psi.

20. An arc suppressor, comprising:

a waveguide run for carrying microwave energy from a microwave source to an oven cavity;

means for sensing an arc within the waveguide run; and means for suppressing the arc, the suppressing means blowing a gas into the waveguide run, in response to a sensed arc in the waveguide run, to suppress the arc.

21. A method of suppressing an arc, comprising:

providing microwave energy from a microwave source in a waveguide run;

sensing an arc formed within the waveguide run; and blowing a gas into the waveguide run, in response to a sensed arc, for suppressing the arc.

22. The method of claim 21, further comprising the step of blowing the gas in a direction away from the microwave source.

23. The method of claim 21, further comprising the step of sensing the arc with a photodetector, the photodetector being positioned on a bend in the waveguide run, the bend being selected from the group consisting of 90 degree round bends, H-bends, and E-bends.

24. The method of claim 21, further comprising the step of opening a valve, upon detection of the arc, to allow the gas to suppress the arc.

25. The method of claim 21, wherein the waveguide run carries the microwave energy to an oven cavity, further comprising the step of continuously feeding articles to be heated through the oven cavity.

26. The method of claim 25, further comprising the step of heating the articles by convection techniques.

27. The method of claim 21, further comprising the step of pressurizing the waveguide run.

28. The method of claim 21, further comprising the step of circularly polarizing the microwave energy.

* * * * *